March 29, 1960     O. C. SIEBRING     2,930,458
CORN CRIB
Filed April 13, 1954
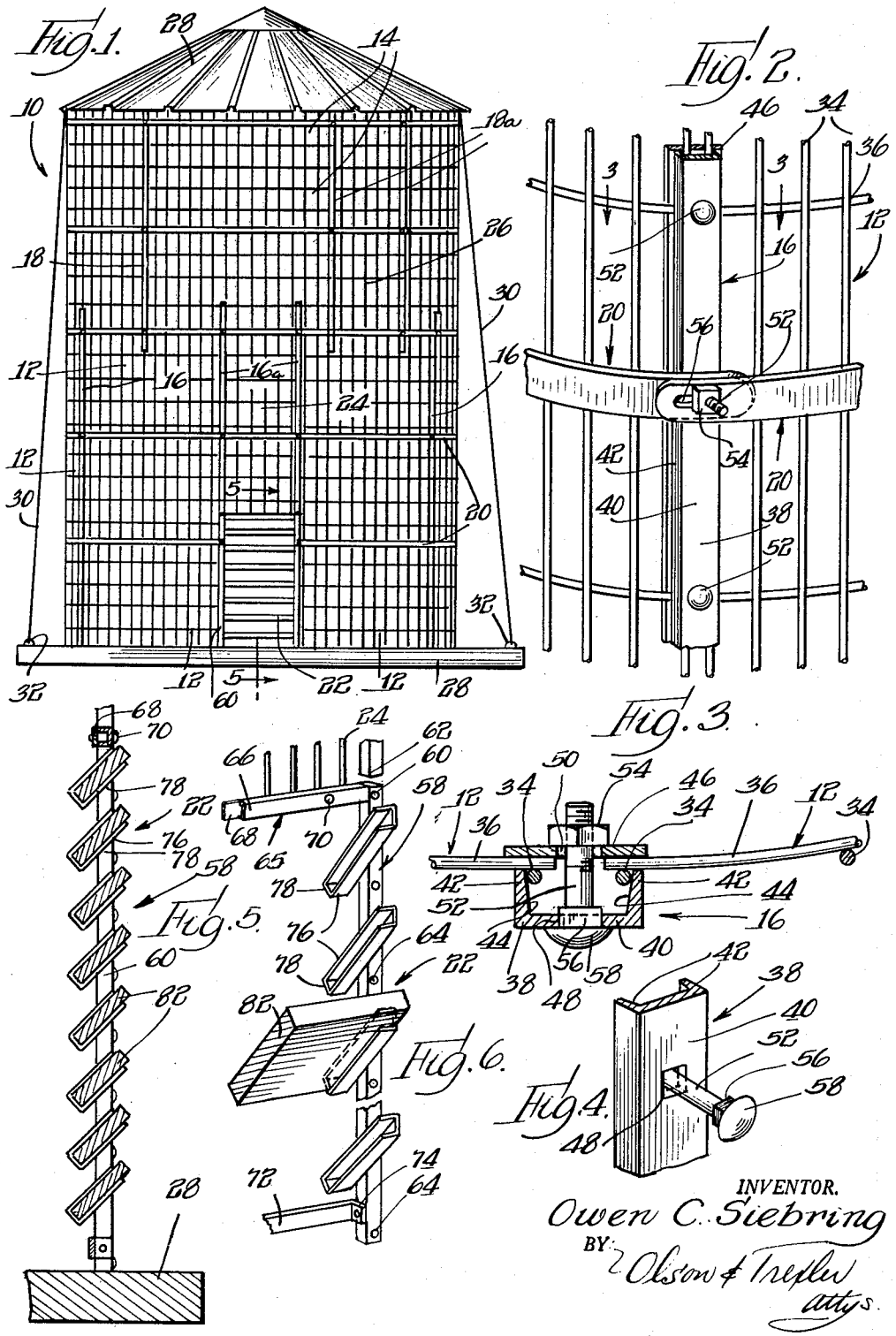
INVENTOR.
Owen C. Siebring
BY Olson & Trexler
attys.

United States Patent Office 2,930,458
Patented Mar. 29, 1960

2,930,458

CORN CRIB

Owen C. Siebring, George, Iowa

Application April 13, 1954, Serial No. 422,821

3 Claims. (Cl. 189—3)

This invention is concerned generally with the storage of cereal grains such as corn, and more particularly it is concerned with an inexpensive and portable corn crib which readily can be set up and taken down as is necessary.

As is well known to those familiar with the storage of cereal grains and other farm crops, corn often is stored on the cob in cribs which are roofed over, but which have openwork sides to allow air to circulate more or less freely through the corn. Such buildings originally were made of wood, and it has been common practice to build corn cribs as more or less permanent structures. Inasmuch as the amount of corn to be stored on any given farm will vary substantially from year to year in accordance with the crop yield, and in accordance with economical conditions, the storage facilities from one year to another may not always be adequate, or may be too great. Need for readily portable cribs, and for cribs which can be assembled and disassembled as necessary thus becomes apparent.

Accordingly, it is an object of this invention to provide a new or improved corn crib of economical construction which readily can be erected or disassembled in accordance with the storage conditions at any particular time.

Another object of this invention is to provide a corn crib made up of sections of interconnected fence wire, particularly such a crib wherein adjacent sections of fence wire are clamped together by elongated channel and bar clamps.

More specifically, it is an object of this invention to provide a corn crib of the foregoing character wherein the flanges of the channel clamp overlie and trap the outer fence wires of adjacent fence wire sections.

An additional object of this invention is to provide an improved corn crib of the character heretofore set forth wherein the clamps extend longitudinally beyond fence wire sections with which they are associated for clamping vertically displaced sections together.

A further object of this invention is to provide a door for a temporary corn crib which clamps onto the fence wire of the crib.

Yet another object of this invention is to provide an improved door in a corn crib which does not let corn fall out of the crib in an uncontrolled manner when the door is opened.

Other and further objects and advantages of the present invention will be apparent from the following description when taken in connection with the accompanying drawings wherein:

Fig. 1 is a front elevational view of a corn crib constructed in accordance with the principles of the invention;

Fig. 2 is a perspective view on an enlarged scale illustrating the means by which the fence wire sections are interconnected and supported;

Fig. 3 is a fragmentary horizontal sectional view on a further enlarged scale taken generally along the lines 3—3 of Fig. 2;

Fig. 4 is an enlarged perspective view of one of the clamp members and an associated bolt for effecting clamping;

Fig. 5 is a vertical sectional view on an enlarged scale through the door of the crib and taken generally along the line 5—5 of Fig. 1; and Fig. 6 is a perspective view illustrating the construction of the door.

Referring now in greater particularity to the drawings, there will be seen at 10 a corn crib constructed in accordance with the principles of the invention. The crib is made up of a number of similar sections 12 of fence wire, which for illustrative purposes are twelve feet in height and six feet in width. The fence wire sections are preferably made of welded 5-gauge galvanized bar mesh. The crib also may include a second series of sections 14 which for illustrative purposes may be considered to be eight feet in height. The sections are held together by vertical clamps 16 and 18, and are reinforced by horizontal rings 20 as will be brought out more completely hereinafter. The crib also is provided with a door 22, and the door necessitates the provision of a smaller fence section 24 immediately above it. A similar narrow section 26 is necessary in the second course to balance the small section 24. The crib is provided with a roof 28, the details of which appear in my co-pending application filed of even date herewith and entitled "Corn Crib Roof," the serial number of said application being 422,822 and now abandoned. The crib is erected on a base or floor 28 which preferably may be of concrete, or which may be of wood, and suitable guide wires 30 are connected from bolts 32 in this base or floor to the crib to anchor the same.

In the illustrative example of the invention, the fence sections 12 each will be understood as comprising a plurality of vertical wires or bars 34 and a plurality of horizontal wires or bars 36 welded together at the crossing points. In erecting the corn crib, the twelve foot fence sections 12 are clamped together by the clamps 16 as may be seen in Figs. 2 and 3.

Each clamp 16 is somewhat greater than twelve feet in length, preferably slightly over twelve and one-half feet, and comprises a channel 38 having a web 40 and a pair of flanges 42. It will be observed that the inner surfaces 44 of the flanges converge inwardly from the free edges of the flanges. The clamps 16 further include a flat bar or strap 46 cooperable with each channel 38. The flat bars or straps 46 are slightly wider than the channels 38, and are equal in length thereto. The channels are provided every six inches with quare holes 48, and the flat bars or straps 46 are provided with alignable square holes similarly spaced. Carriage bolts 52 are designed to be passed through these aligned holes and nuts 54 are provided for threading on the ends of the bolts. Each bolt is provided with a square section 56 immediately adjacent its head 58 for fitting into the square openings of either the channel or flat bar or strap to prevent rotation of the bolt as the nut is threaded thereon.

As will be observed in Figs. 2 and 3 each channel 16 embraces the outer, adjacent vertical wires or rods 34 of the adjacent head sections 12, and crosses the horizontal wires or rods 36. The flat bar or strap 46 is arranged in opposition to its cooperating channel, and is forced toward the channel by threading the nuts 54 on the bolts 52. This causes the channel flanges 42 to clamp the horizontal wires or bars 36 against the flat bar or strap 46 while holding the vertical wires 34 trapped within the channel. It will be appreciated that the vertical wires 34, particularly those along the edges of the fence sections, are likely to become slightly bent in use. The converging inner surfaces 44 of the channel act to cam the vertical wires 34 inwardly as the nuts 54 are tightened, thereby bringing any bent portions of the vertical wires 34 into proper trapped position within the channels 38.

The rings or bands 20 preferably are spaced four feet apart vertically. Inasmuch as the bolts 52 are spaced every six inches, the bands readily may be positioned in alignment with the bolts so that the bolts will pass through suitable apertures therein for clamping the bands to the fence wire and to the clamps to strengthen and rigidify the corn crib. The bands 20 conveniently are semi-circular in form, and as will be seen in Fig. 2 the bands overlap one another at the ends and are provided with elongated slots 56 through which the bolts 52 pass, the slots allowing any necesary adjustment to cause the bands to fit tightly about the crib.

The details of construction of the door 22 are shown in Figs. 5 and 6. The door includes a pair of side frame members 58 which are similar in construction to the clamps 16, including channels 60 and flat bar or strap portions 62 held together by suitable nuts and bolts 64. This allows the door readily to be clamped on to the adjacent fence wire sections 12 in the same manner as the clamps hold adjacent sections together. The vertical side frame members 58 are interconnected at their upper ends by a horizontal or top frame member 65 of similar construction, including a channel 66 and a flat strap or bar 68 secured thereto by nuts and bolts 70. The top of the door frame thus is readily clamped onto the narrow fence wire section 24 directly above the door. The vertical or side frame members 58 are spaced at their bottoms by a simple metal strap 72 having right angularly disposed end flanges 74 which are bolted, welded, or otherwise suitably secured to the side frame members. It will be understood that the top piece or frame member 65 of the door frame is welded to the side pieces 58, or is otherwise suitably secured thereto.

Holders or slides 76 are provided on the side frame members 60 and comprise short channels arranged obliquely of the side frame members 60. The channels are suitably secured to the side frame members by means such as welds 78, and have their open faces inwardly directed in substantially confronting relation. The inner ends of the channels 76 are oriented substantially below the outer ends, and are closed off as at 78 by any suitable means such as small plates welded in place. A board 82 is designed to slide into the channels of each opposed pair of slides or holders, and the vertical projections of the boards overlap one another slightly so that corn will not tend to move outwardly through the door with all of the boards in place. When it is desired to remove corn from the crib, one or more of the boards 82 may be retracted from position in the associated holders. The downward inclination of the boards remaining in the door tends to prevent the corn from spilling out of the opening, so that only as much corn is removed as is pulled out manually.

It will be apparent that the small fence wire section 24 is necessary to fill in above the door 22. Short clamps 16a are provided above the door to hold the small fence wire section 24 to the adjacent full size sections 12.

The clamps 18 holding the fence wire sections of the upper course to one another are identical with the clamps 16. Since the upper fence wire sections are of the same width as the lower sections, the narrow section 26 is necessary to balance the small section 24 in the lower course. The clamps indicated at 18a immediately adjacent the small or narrow section 26 are identical with the clamps 18.

It will be observed that the clamps 16 extend upwardly and overlap the fence wire sections 14 of the upper course by more than six inches, thus holding the upper course of fence wire to a lower course. Similarly, the clamps 18 extend down over the fence wire section 12 more than six inches, thus additionally securing the upper course of fence wire sections to the lower course. The details of construction of the roof are set forth in my co-pending application Serial No. 422,822 as indicated heretofore, and little may be said of the roof in this application except that it preferably is conical in configuration and is held on top of the crib by hook bolts passing through the roof 28 and hooking over the uppermost horizontal wires or bars 36 of the crib.

It now should be apparent that the corn crib heretofore disclosed can be readily set up or erected substantially in any place and at any time as conditions require. In actual practice it has been found that the crib readily can be erected by two men. The clamps for holding the fence wire sections together are readily applied, and the channels trap the vertical wires of the fence wire while clamping against the horizontal wires to hold the sections together. The extensions of the clamps easily clamp the vertically displaced sections together, while similar clamps readily fasten the door to the corn crib. The door of the crib is of improved construction allowing corn to be removed without spilling any of the corn. It will be apparent that the parts are as readily disassembled as they are set up, thus allowing the cribs to be taken down when not in use and stored flat in order to take up a minimum of storage room. The door is of improved construction, retaining corn in the crib while a desired amount of corn is pulled from the crib, and readily clamps onto the crib in the same manner that the fence sections are clamped together to form the crib.

It will be understood that the crib can be lined with hard board or the like so that small grains can be stored in the crib without spilling out through the fence wire.

The specific example herein shown and described will be understood as being for the purposes of illustration. Various changes in structure will doubtless occur to those skilled in the art, and such changes will be understood as comprising a part of the invention insofar as they fall within the spirit and scope of the invention, as expressed in the appended claims.

The invention is hereby claimed as follows:

1. A corn crib or the like comprising a plurality of sections each of which includes crossed vertical and substantially horizontal fence wire and the sections being arranged in superposed courses including a plurality of circumferentially arranged sections forming a substantially cylindrical enclosure, inner and outer vertically elongated and vertically disposed clamping members extending over adjacent vertical edges of a plurality of superposed sections and spaced circumferentially around the enclosure complementary to the adjacent vertical edges of the sections of the same course, the end portions of certain of said clamping members projecting downwardly and others upwardly at least partially across superposed horizontally adjacent sections and lapped with respect to each other and holding together the adjacent superposed courses of wire sections, one of said clamping members comprising a substantially U-shaped channel having the side leg portions thereof internally gripping adjacent vertical wires of adjacent sections and the other of said clamping members comprising an elongated plate at least as wide as the spacing of said side leg portions of said one clamping member with the substantially horizontal fence wires of adjacent sections gripped between said clamping members, and securing means clamping together said elongated clamping members at vertically spaced intervals with the adjacent vertical edges of adjacent sections gripped therebetween.

2. A corn crib or the like as claimed in claim 1, wherein there are provided circumferential clamping straps disposed at vertically spaced intervals around the enclosure and surrounding the assembled sections with at least one of said clamping straps passing over and secured to the end portions of clamping members which are lapped relative to one another.

3. A corn crib or the like as claimed in claim 2 wherein the securing means comprises bolt means passing through the clamping members and the clamping straps.

References Cited in the file of this patent

UNITED STATES PATENTS

| | | |
|---|---|---|
| 472,137 | McCallip | Apr. 5, 1892 |
| 593,266 | Wright | Nov. 9, 1897 |
| 820,020 | Shaffer | May 8, 1906 |
| 1,732,400 | Eaton | Oct. 22, 1929 |
| 1,841,360 | Brandl | Jan. 19, 1932 |
| 2,161,978 | Rosenbaum | June 13, 1939 |
| 2,171,121 | Carr | Aug. 29, 1939 |
| 2,459,198 | St. John | Jan. 18, 1949 |
| 2,571,753 | Pennington | Oct. 16, 1951 |
| 2,654,917 | Greaves | Oct. 13, 1953 |

FOREIGN PATENTS

| | | |
|---|---|---|
| 863,253 | Germany | Jan. 15, 1953 |
| 1,033,087 | France | Apr. 1, 1953 |